United States Patent
Arai

(10) Patent No.: US 8,935,966 B2
(45) Date of Patent: Jan. 20, 2015

(54) DUAL CLUTCH TRANSMISSION APPARATUS, MOTORCYCLE, AND START CONTROL METHOD

(75) Inventor: Katsuhiro Arai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 230 days.

(21) Appl. No.: 13/699,466

(22) PCT Filed: Apr. 22, 2011

(86) PCT No.: PCT/JP2011/002366
§ 371 (c)(1),
(2), (4) Date: Nov. 21, 2012

(87) PCT Pub. No.: WO2011/148566
PCT Pub. Date: Dec. 1, 2011

(65) Prior Publication Data
US 2013/0081491 A1  Apr. 4, 2013

(30) Foreign Application Priority Data

May 26, 2010   (JP) ................................. 2010-120791

(51) Int. Cl.
*F16H 3/08* (2006.01)
*F16H 59/00* (2006.01)
(Continued)

(52) U.S. Cl.
CPC *F16H 3/08* (2013.01); *F16D 48/08* (2013.01); *F16H 61/688* (2013.01); *F16D 2500/1024* (2013.01); *F16D 2500/1086* (2013.01); *F16D 2500/1117* (2013.01); *F16D 2500/30405* (2013.01); *F16D 2500/50224* (2013.01); *F16D 2500/50296* (2013.01); *F16H 3/006* (2013.01); *F16H 3/16* (2013.01); *F16H 2312/02* (2013.01); *F16H 2003/0815* (2013.01)
USPC .............................................. 74/330; 74/335

(58) Field of Classification Search
USPC ...................................................... 74/330, 335
See application file for complete search history.

(56) References Cited

U.S. PATENT DOCUMENTS

2009/0078069 A1* 3/2009 Nedachi et al. ................. 74/330
2009/0287387 A1* 11/2009 Tomoda .......................... 701/68
(Continued)

FOREIGN PATENT DOCUMENTS

DE   100 15 296 A1   8/2001
JP   58-124851 A    7/1983
(Continued)

OTHER PUBLICATIONS

Official Communication issued in corresponding European Patent Application No. 11786270.6, mailed on Oct. 15, 2013.
(Continued)

*Primary Examiner* — Ha D Ho
(74) *Attorney, Agent, or Firm* — Keating & Bennett, LLP

(57) ABSTRACT

In a dual clutch transmission, a transmission control unit operates at vehicle start such that a clutch engaged is changed from a second clutch, which is on a high speed gear stage side, to a first clutch, which is on a low speed gear stage side, resulting in a torque transmission path being changed. At this time, torque capacities of the first and second clutches change so that thermal loads on the first and second clutches are equal or approximately equal according to a clutch rotational speed difference that is a rotational speed difference between the driving side and the driven side in the first clutch.

5 Claims, 8 Drawing Sheets

(51) Int. Cl.
*F16D 48/08* (2006.01)
*F16H 61/688* (2006.01)
*F16H 3/00* (2006.01)
*F16H 3/16* (2006.01)

(56) References Cited

U.S. PATENT DOCUMENTS

| | | |
|---|---|---|
| 2010/0107792 A1 | 5/2010 | Saitoh |
| 2010/0107809 A1 | 5/2010 | Saitoh |
| 2010/0108422 A1 | 5/2010 | Saitoh |
| 2011/0190996 A1* | 8/2011 | Nedachi et al. ............ 701/67 |
| 2012/0239264 A1* | 9/2012 | Kojima et al. ............ 701/53 |
| 2013/0081491 A1* | 4/2013 | Arai ............ 74/331 |

FOREIGN PATENT DOCUMENTS

| | | |
|---|---|---|
| JP | 2010-106982 A | 5/2010 |
| JP | 2010-106983 A | 5/2010 |

OTHER PUBLICATIONS

Official Communication issued in International Patent Application No. PCT/JP2011/002366, mailed on Jul. 12, 2011.

* cited by examiner

DUAL CLUTCH TRANSMISSION APPARATUS, MOTORCYCLE, AND START CONTROL METHOD

BACKGROUND OF THE INVENTION

1. Field of the Invention

The present invention relates to a dual clutch transmission apparatus that controls a plurality of clutches, and to a motorcycle and a start control method.

2. Description of the Related Art

Conventional multi-stage vehicle transmissions having a plurality of clutches enabling fast gear change on automobiles are known (see, for example, Japanese Patent Application Laid-Open No. 58-124851).

In a multi-stage vehicle transmission disclosed in Japanese Patent Application Laid-Open No. 58-124851, a first clutch connects and disconnects an input shaft that receives the driving force of an engine to and from a first main shaft provided rotatably on the input shaft, and a second clutch connects and disconnects an input shaft to and from a second main shaft provided coaxially with the input shaft.

In this multi-stage vehicle transmission, a sub shaft connected to an output shaft is disposed parallel to the input shaft, the first main shaft and the second main shaft. This enables transmission at a predetermined gear ratio from either the first main shaft or the second main shaft to the sub shaft through a plurality of gears by the connection of either the first clutch or the second clutch. The output shaft connected to the sub shaft is thereby rotated to output a driving force.

Thus, in the above-described multi-stage vehicle transmission, the rotation speed of the output shaft is changed by selectively connecting the first clutch and the second clutch to transmit a torque on the input shaft to the sub shaft at a different gear ratio, without blocking power at the time of gear change.

In recent years, there has been a demand for providing a motorcycle having a limited mount space, with a multi-stage vehicle transmission having a plurality of clutches mounted on an automobile. To mount such a multi-stage vehicle transmission having a plurality of clutches on a motorcycle, it is desirable that the transmission itself is downsized.

In a transmission, a clutch is connected and disconnected on the basis of the state of engagement between a drive-side member and a first main shaft-side member (the relative position of the two members) and has a comparatively large weight as a member of a drive transmission system.

In an arrangement having a plurality of such clutches, the weight of the multi-stage transmission itself may be increased in comparison with a multi-stage transmission having one clutch. This leads to a need for providing a transmission that has a small size by reducing the size of a clutch itself.

The size of a clutch is proportional to a thermal load at which the clutch can withstand frictional heat generated in a half-engaging state (in which the clutch slips while transmitting a torque) in connection with and disconnection of the clutch, particularly frictional heat generated at the start of the drive operation upon changing from a neutral (N) position to a first gear position. That is, to have a thermal load at which it can withstand frictional heat generated in a half-engaging state, it is required to increase the sizes of each of the drive-side member and the driven-side member, which are to be half-engaged.

That is, in such an arrangement in which clutches are simply reduced in size, a multi-stage transmission cannot withstand a thermal load at the start of the drive operation. Thus, the multi-stage transmission requires larger clutches having a size so as to be capable of operating under the thermal load at the start of the drive operation, which causes the transmission to become heavier.

SUMMARY OF THE INVENTION

Preferred embodiments of the present invention provide a dual clutch transmission apparatus, a motorcycle and a start control method, with which thermal loads on clutches at the start of operation can be reduced, the durability thereof is vastly improved, and the weight of the clutch itself is significantly reduced.

According to one aspect of a preferred embodiment of the present invention, a dual clutch transmission apparatus includes a first clutch that transmits or interrupts torque from a crankshaft to a first main shaft; a second clutch that transmits or interrupts a torque from the crankshaft to a second main shaft; an output shaft to which the torque of the first main shaft is transmitted through an odd-numbered transmission gear mechanism set as an odd-numbered transmission gear, and to which the torque of the second main shaft is transmitted through an even-numbered transmission gear mechanism set as an even-numbered transmission gear; a transmission mechanism that changes the engagement between gears in the odd-numbered transmission gear mechanism and the even-numbered transmission gear mechanism, and a transmission control unit that, at the start of a drive operation of a vehicle, shifts from a clutch on a higher transmission gear side to a clutch on a lower transmission gear side by controlling the two clutches with predetermined odd-numbered and even-numbered transmission gears, respectively, in a set state, through the transmission mechanism, wherein, at the start of the drive operation of the vehicle, with the vehicle in a state where a total torque capacity of the two clutches is set to a value necessary to start operation of the vehicle, the transmission control unit shifts the two clutches by gradually increasing the torque capacity of the clutch on the lower transmission gear side curvilinearly according to a difference in clutch rotational speed on the lower transmission gear side, while at the same time gradually reducing the torque capacity of the clutch on the higher transmission gear side.

According to another aspect of a preferred embodiment of the present invention, there is provided a motorcycle including the dual clutch transmission apparatus arranged as described above.

According to another aspect of a preferred embodiment of the present invention, a start control method for a dual clutch transmission apparatus including a first clutch that inputs a torque transmitted from a crankshaft to a first main shaft and that outputs the torque to a drive wheel of a vehicle through an odd-numbered transmission gear mechanism set as an odd-numbered transmission gear and a second clutch that inputs a torque transmitted from the crankshaft to a second main shaft and that outputs the torque to the drive wheel through an even-numbered transmission gear mechanism set as an even-numbered transmission gear, includes the steps of setting predetermined odd-numbered and even-numbered transmission gears in the odd-numbered transmission gear mechanism and the even-numbered transmission gear mechanism respectively; and changing a transmission path for the torque, including controlling the first clutch and the second clutch so that a total torque capacity of the two clutches is set to a value necessary to start the vehicle, and in that state shifts the two clutches by gradually increasing the torque capacity of the clutch on a lower transmission gear side curvilinearly according to a difference in clutch rotational speed between a drive side and a first main shaft side in the clutch on the lower transmission gear side, while at the same time gradually reducing the torque capacity of the clutch on a higher transmission gear side.

According to various preferred embodiments of the present invention, the thermal load on each clutch at the start of operation can be reduced, the durability thereof is vastly improved, and the weight of the clutch itself is significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the drawings.

A dual clutch transmission apparatus according to a preferred embodiment of the present invention will be described by assuming that a vehicle on which the transmission apparatus is mounted is a motorcycle, for example. However, the present invention is not particularly limited. A controller and a dual clutch transmission controlled by the controller may be mounted on a four-wheel motor vehicle, a three-wheel motor vehicle or any other suitable vehicle, for example.

Figure 1:
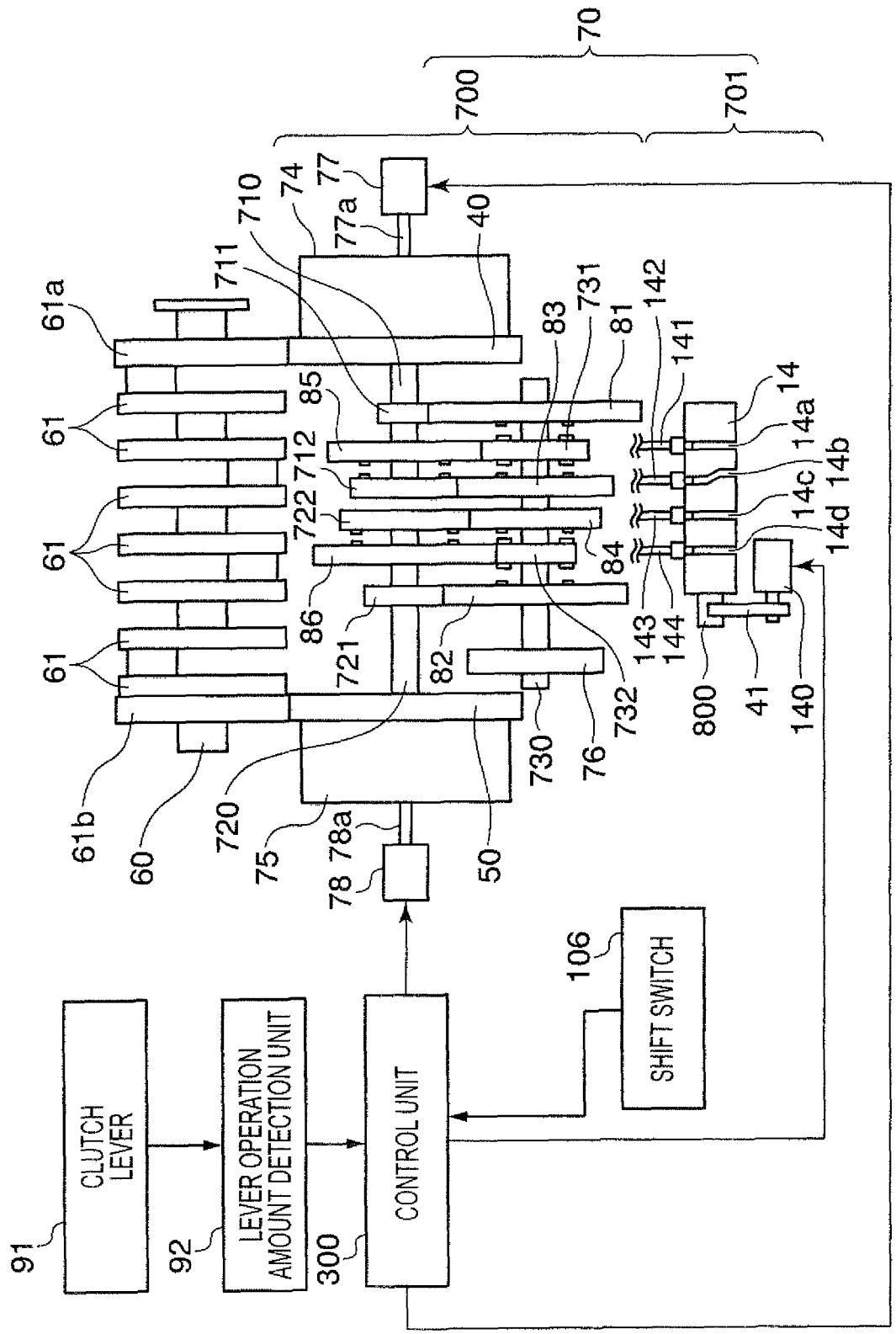
FIG. 1 is a schematic diagram showing the construction of a portion of a dual clutch transmission in a dual clutch transmission apparatus according to a preferred embodiment of the present invention.

A dual clutch transmission controlled by the dual clutch transmission apparatus according to a preferred embodiment of the present invention will be outlined with reference to FIG. 1.

FIG. 1 is a schematic diagram showing the construction of a portion of a dual clutch transmission 70 in a dual clutch transmission apparatus according to a preferred embodiment of the present invention.

Dual clutch transmission (DCT) (hereinafter referred to simply as "transmission") 70 is shown in FIG. 1. Transmission 70 enables transmission of driving force to an odd gear or even gear by alternatively switching a plurality of clutches (first clutch 74 and second clutch 75). Transmission 70 enables a driver to perform a clutch operation (to adjust the clutch capacities of first clutch 74 and second clutch 75) by using by-wire clutch lever 91 in the DCT.

As shown in FIG. 1, transmission 70 includes transmission mechanism 700 that varies a torque transmitted from crankshaft 60 of an engine to transmit the torque to a rear wheel (not illustrated) according to an operation of clutch lever 91, and shift mechanism 701 that achieves transmission in transmission mechanism 700 according to an operation on shift switch 106. Shift switch 106 may be a shift pedal, for example.

Crankshaft 60 is disposed perpendicularly or substantially perpendicular to the front-rear direction of the vehicle and horizontally or substantially horizontally (in a lateral direction) in the motorcycle. Crankshaft 60 includes a plurality of crank webs 61. Crank web 61a, which is an external gear disposed on one end of crankshaft 60 meshes with first primary first main shaft gear (also referred to as "first input gear") 40 in first clutch 74. Power transmitted from crank web 61a to first input gear 40 by this meshing is transmitted to first main shaft 710 of transmission 70 through first clutch 74. On the other hand, crank web 61b, which is an external gear disposed on the other end of crankshaft 60 meshes with second primary first main shaft gear (also referred to as "second input gear") 50 in second clutch 75. Power transmitted from crank web 61b to second input gear 50 by this meshing is transmitted to second main shaft 720 through second clutch 75.

Transmission mechanism 700 includes first main shaft (first main shaft portion) 710, second main shaft (second main shaft portion) 720 and drive shaft (output shaft) 730 disposed parallel to crankshaft 60, first clutch 74, second clutch 75, gears 81 to 86, 711, 712, 721, 722, 731, and 732 through which power is transmitted between shafts 710 to 730, drive sprocket (hereinafter referred to simply as "sprocket") 76, first clutch actuator 77, and second clutch actuator 78.

First clutch 74 and second clutch 75 are spaced apart from each other in a direction (a left-right direction in the drawing) perpendicular to the front-rear direction of the vehicle to hold first main shaft 710 and second main shaft 720 from opposite lateral sides of the vehicle.

First clutch 74 is provided between crankshaft 60 and first main shaft 710, while second clutch 75 is provided between crankshaft 60 and second main shaft 720.

First clutch actuator 77 and second clutch actuator 78 cause first clutch 74 and second clutch 75, respectively, to transmit a torque outputted from the engine to a downstream side in a torque transmission path or block the torque.

More specifically, first clutch 74 driven by first clutch actuator 77 engages first input gear 40 with first main shaft 710 to transmit to first main shaft 710 rotation power from the engine through crankshaft 60. Also, first clutch 74 driven by first clutch actuator 77 disengages and releases first input gear 40 and first main shaft 710 to block, in a free state, the rotation power to be transmitted from the engine to first main shaft 710. Thus, with the transition from the engaging state to the free state, first clutch 74 gradually reduces the torque transmitted through the clutch (the clutch torque capacity) transmitting rotation power from the engine to first main shaft 710, and, with the transition from the free state to the engaging state, first clutch 74 gradually increases the transmitted torque. In this description, "engaging state" refers to a state in which the rotational speed difference at a clutch is reduced to zero by the clutch torque capacity, and a state in a clutch from the engaging state to the free state is also referred to as "half-engaging state".

First clutch 74 preferably is a clutch with a multi-plate structure including a drive-side portion with friction plates or the like, which rotates together with first input gear 40, and a first main shaft-side portion with clutch plates or the like, which rotates together with first main shaft 710. First clutch 74 is connected to first pull rod 77a of first clutch actuator 77 controlled by a transmission control unit (TCU 110 shown in FIG. 2) of control unit 300. In first clutch 74, when first pull rod 77a is drawn in the direction of moving away from first clutch 74, a plurality of clutch plates and a plurality of friction plates are separated from each other to cut the transmission of a torque from first input gear 40 to first main shaft 710, that is, to block the transmission of power to first main shaft 710. On the other hand, when first pull rod 77a is moved to first clutch 74 side, the plurality of clutch plates and the plurality of friction plates attach closely to each other to transmit a torque to first main shaft 710, that is, to transmit power through odd-numbered gears including a group of odd gears (first gear 81, third gear 83 and fifth gear 85).

Second clutch 75 driven by second clutch actuator 78 engages second input gear 50 with second main shaft 720 to transmit to second main shaft 720 rotation power from the engine through crankshaft 60. Also, second clutch 75 driven by second clutch actuator 78 disengages and makes free second input gear 50 and second main shaft 720 to block, in a free state, the rotation power to be transmitted from the engine to second main shaft 720. Thus, with the transition from the engaging state to the free state, second clutch 75 gradually reduces the torque transmitted through the clutch (the clutch torque capacity) transmitting rotation power from the engine to second main shaft 720, and, with the transition from the free state to the engaging state, second clutch 75 gradually increases the transmitted torque.

Second clutch 75 preferably is a clutch with a multi-plate structure like first clutch 74. Second clutch 75 includes a drive-side portion with friction plates or the like, which rotates together with second input gear 50, and a first main shaft-side portion with clutch plates or the like, which rotates together with second main shaft 720. Second clutch 75 is connected to second pull rod 78a of second clutch actuator 78 controlled by transmission control unit 110 of control unit 300. In second clutch 75, when second pull rod 78a is drawn in the direction of moving away from second clutch 75, a plurality of clutch plates and a plurality of friction plates are separated from each other to cut the transmission of a torque from second input gear 50 to second main shaft 720, that is, to block the transmission of power to second main shaft 720. On the other hand, when second pull rod 78a is moved to the second clutch 75 side, the plurality of clutch plates and the plurality of friction plates are attached to each other and torque is transmitted to second main shaft 720, i.e., power transmission is performed through even-numbered gears including a group of even gears (second gear 82, fourth gear 84, and sixth gear 86).

In each of first clutch 74 and second clutch 75, the state in each clutch from the engaging state to the free state is defined with the relative position of the drive-side portion and the first main shaft-side portion. The relative position of the drive-side portion and the first main shaft-side portion is also referred to as "clutch position". The torque transmitted through the clutch (clutch torque capacity) is determined by this clutch position.

Thus, first clutch 74 and second clutch 75 are driven and controlled by control unit 300 (more specifically by TCU 110 shown in FIG. 2) through first clutch actuator 77 and second clutch actuator 78.

Power transmitted to first and second main shafts 710 and 720 is transmitted to drive shaft 730 disposed at a rear position in the vehicle through gears selected as desired from gears 81 to 86, 711, 712, 721, 722, 731, and 732 constituting the transmission gears.

Sprocket 76 is fixed on one end (left end) of drive shaft 730. By the rotation of drive shaft 730, the driving force from transmission 70 is transmitted to the rear wheel, which is a drive wheel, through a drive chain (not illustrated) wound around sprocket 76. Thus, torque generated by the engine is output from drive shaft 730 via first clutch 74 or second clutch 75 and a predetermined gear train that corresponds to each transmission gear, to thereafter drive the rear wheel (drive wheel).

The outside diameter of a power transmitting portion of first main shaft 710 and the outside diameter of a power transmitting portion of second main shaft 720 are substantially equal to each other. The power transmitting portion of first main shaft 710 is a portion through which the driving force outputted to drive shaft 730 through gears in an odd gear (gears 81, 83, 85, 711, 712, and 731) is transmitted. The power transmitting portion of second main shaft 720 is a portion through which the driving force outputted to drive shaft 730 through gears in an even gear (gears 82, 84, 86, 721, 722, and 732) is transmitted. The power transmitting portion of first main shaft 710 and the power transmitting portion of second main shaft 720 are disposed concentrically without interfering with each other. In transmission mechanism 700, first main shaft 710 and second main shaft 720 having outside diameters equal to each other are disposed side by side in left and right positions on one axial line and are rotated independently of each other.

First main shaft 710 is connected to first clutch 74, while second main shaft 720 is connected to second clutch 75.

On first main shaft 710, the transmission gears (fixed gear 711, fifth gear 85 and spline gear 712) constituting the odd gears are disposed sequentially from the base end to which first clutch 74 is connected.

Fixed gear 711 (also referred to as "first-capable gear") preferably is integral with first main shaft 710 and rotates together with first main shaft 710. Fixed gear 711 meshes with first gear 81 (first main shaft-side gear) on drive shaft 730.

Fifth gear 85 is mounted on first main shaft 710 in a position between first-capable fixed gear 711 and third-capable spline gear 712 (third-capable gear) at certain distances from these gears so as to be rotatable about the axis of first main shaft 710 while being prevented from moving in the axial direction.

Fifth gear 85 meshes with spline gear 731 (fifth-capable gear as a first main shaft-side gear) on drive shaft 730.

Spline gear 712 (also referred to as "third-capable gear") is mounted on first main shaft 710 so as to be slidable along the axial direction while being prevented from rotating relative to first main shaft 710 by splines arranged along the axial direction on the outer periphery of a fore end of first main shaft 710. Spline gear 712 meshes with third gear 83 (first main shaft-side gear) on drive shaft 730.

Spline gear 712 is moved on first main shaft 710 in the axial direction by the movement of shift fork 142 connected thereto. Spline gear 712 is moved toward fifth gear 85 on first main shaft 710 to be brought into engagement with fifth gear 85, thereby preventing fifth gear 85 from rotating (racing) about the axis on first main shaft 710. By engagement of spline gear 712 with fifth gear 85, fifth gear 85 is fixed on first main shaft 710 to be able to rotate integrally with the rotation of first main shaft 710.

On the other hand, on second main shaft 720, the transmission gears (fixed gear 721, sixth gear 86 and spline gear 722) constituting the even gears are disposed in order from the base end to which second clutch 75 is connected.

Fixed gear 721 (also referred to as "second-capable gear") preferably is integral with second main shaft 720 and meshes with second gear 82 (first main shaft-side gear) on drive shaft 730.

Sixth gear 86 is mounted on second main shaft 720 in a position between second-capable fixed gear 721 and spline gear 722, which is a fourth-capable gear, at certain distances from these gears so as to be rotatable about the axis of second main shaft 720 while being prevented from moving in the axial direction. Sixth gear 86 meshes with spline gear 732 (sixth-capable gear as a first main shaft-side gear) on drive shaft 730.

Spline gear 722 (also referred to as "fourth-capable gear") is mounted on second main shaft 720 so as to be slidable along the axial direction while being prevented from rotating relative to second main shaft 720 by splines arranged along the axial direction on the outer periphery of a fore end of second main shaft 720. Spline gear 722 meshes with fourth gear 84 (first main shaft-side gear) on drive shaft 730.

Spline gear 722 is moved on second main shaft 720 in the axial direction by the movement of shift fork 143 connected thereto. Spline gear 722 is moved toward sixth gear 86 on second main shaft 720 to be brought into engagement with sixth gear 86, thereby preventing sixth gear 86 from rotating (racing) about the axis on second main shaft 720. By engagement of spline gear 722 with sixth gear 86, sixth gear 86 is fixed on second main shaft 720 to be able to rotate integrally with the rotation of second main shaft 720.

On the other hand, first gear 81, spline gear 731 (fifth-capable gear), third gear 83, fourth gear 84, spline gear 732 (sixth-capable gear), second gear 82 and sprocket 76 are disposed on drive shaft 730 in order from the first clutch 74 side. First gear 81, third gear 83, fourth gear 84 and second gear 82 are arranged so as to be rotatable about drive shaft 730 while being prohibited from moving along the axial direction of drive shaft 730.

Spline gear 731 (also referred to as "fifth-capable gear") is mounted so as to be slidable on drive shaft 730 in a thrust direction and rotatable with drive shaft 730. Spline gear 731 is connected to shift fork 141 of shift mechanism 701. With a movement of shift fork 141, spline gear 731 is moved on drive shaft 730 along the axial direction.

Spline gear 732 (also referred to as "sixth-capable gear") is mounted so as to be movable on drive shaft 730 in a thrust direction and rotatable with drive shaft 730. Spline gear 732 is connected to shift fork 144 of shift mechanism 701. With a movement of shift fork 144, spline gear 732 is moved on drive shaft 730 along the axial direction.

Spline gears 712, 722, 731, and 732 respectively function as transmission gears and also function as dog selectors. More specifically, projections and recesses fitting each other are located on surfaces facing each other of spline gears 712, 722, 731, and 732 and the transmission gears adjacent to spline gears 712, 722, 731, and 732 in the axial direction. By fitting the projections and recesses to each other, each pair of gears rotates integrally.

Thus, spline gears 712, 722, 731, and 732 are moved in the axial direction by drive with connected shift forks 141 to 144 so that each spline gear is connected to the transmission gear (in first gear 81 to sixth gear 86) adjacent to the spline gear in the axial direction by the dog mechanism.

Gear shifting to be performed on gears 81 to 86, 711, 712, 721, 722, 731, and 732 in transmission mechanism 700 is performed with shift forks 141 to 144 movable with the rotation of shift cam 14 in shift mechanism 701.

Shift mechanism 701 that selects a gear in transmission mechanism 700 includes shift cam drive apparatus 800 that rotatingly drives shift cam 14 with which shift forks 141 to 144 are operated, motor 140, and transfer mechanism 41 that connects motor 140 and shift cam drive apparatus 800 and transmits the driving force of motor 140 to shift cam drive apparatus 800.

Shift forks 141 to 144 span between spline gears 731, 712, 722, and 732, respectively, and shift cam 14. Shift forks 141 to 144 are spaced apart from each other along the axial directions of first and second main shafts 710 and 720, drive shaft 730 and shift cam 14. Shift forks 141 to 144 are parallel or substantially parallel to each other, each fork being movable along the axial direction of the axis of rotation of shift cam 14.

Shift forks 141 to 144 include pin portions on their base end sides movably disposed respectively in four cam grooves 14a to 14d provided in the outer circumferential surface of shift cam 14. In other words, shift forks 141 to 144 are first main shaft members on shift cam 14 provided as a drive member. Shift forks 141 to 144 are slidingly moved along the axial directions of first and second main shafts 710 and 720 and drive shaft 730 according to the profiles of cam grooves 14a to 14d of shift cam 14. By this sliding movement, each of spline gears 731, 712, 722, and 732 connected to extreme ends is moved along the axial direction on the shaft passed through its bore.

Shift cam 14 preferably has a cylindrical shape and is disposed so that the axis of rotation is parallel or substantially parallel to first main shaft 710, second main shaft 720 and drive shaft 730.

Shift cam 14 is driven and rotated by the driving force of motor 140 transmitted to shift cam drive apparatus 800 through transfer mechanism 41. By this rotation, at least one of shift forks 141 to 144 according to the profiles of cam grooves 14a to 14d is moved along the axial direction of the axis of rotation of shift cam 14.

With the movements of some of shift forks 141 to 144, which are movable by following the rotation of shift cam 14 having such cam grooves 14a to 14d, the spline gears connected to the moving shift forks are moved, thus performing gear shifting in transmission 70 (transmission mechanism 700).

In transmission 70 including transmission mechanism 700, the driving force of the engine from crankshaft 60 is outputted through one of the independent two systems including first main shaft 710 and second main shaft 720 and through drive shaft 730 by the operations of first clutch 74 and second clutch 75 and the corresponding operation of shift mechanism 701. With the rotation of drive shaft 730, sprocket 76 rotates to drive the rear wheel through the chain.

Figure 2:
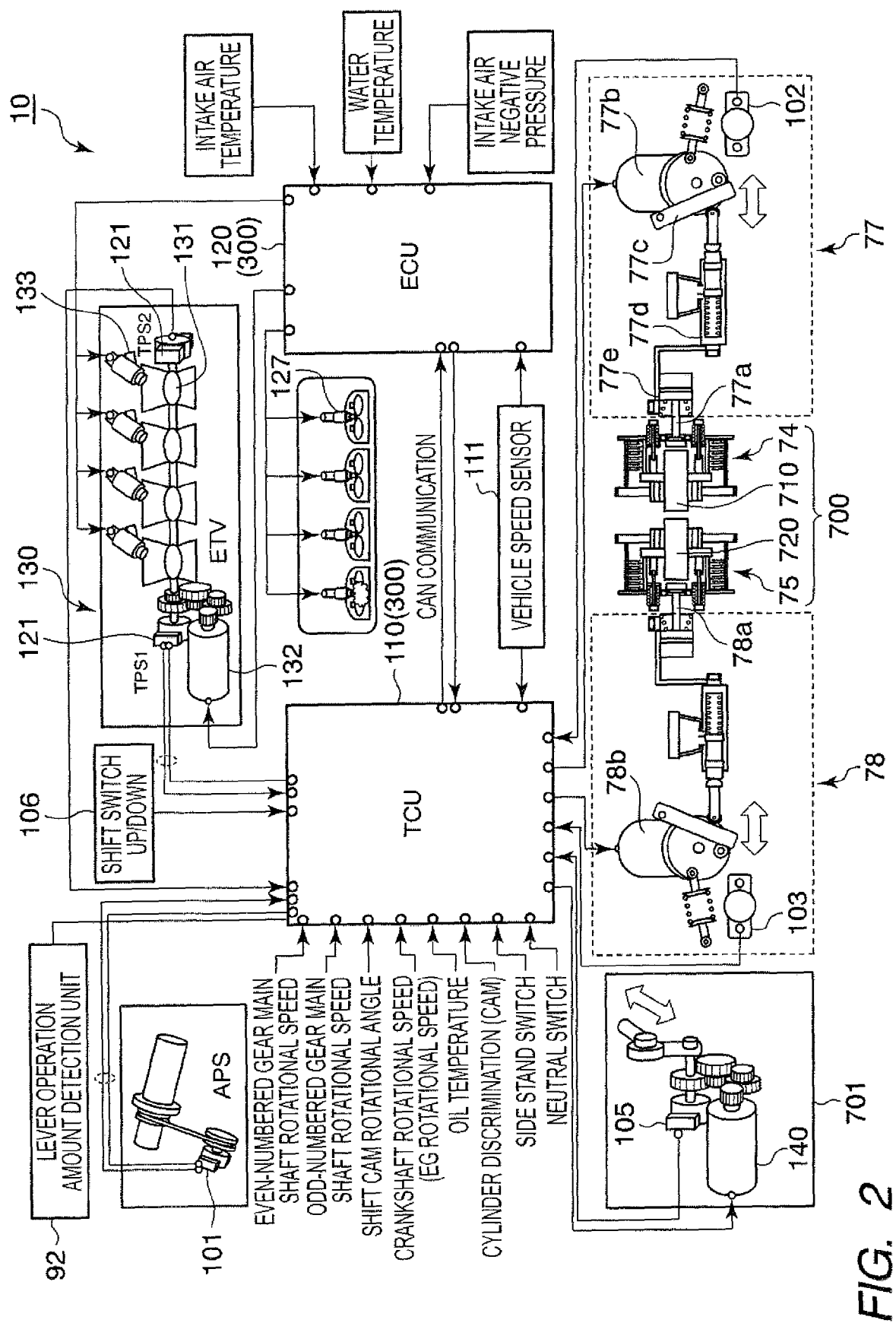
FIG. 2 is a schematic diagram showing a control system for a motorcycle including the dual clutch transmission apparatus according to a preferred embodiment of the present invention.

First and second clutch actuators 77 and 78 of transmission mechanism 700 and motor 140 that drive shift forks 141 to 144 in shift mechanism 701 are controlled by control unit 300 in control system 10 (see FIG. 2).

FIG. 2 is a schematic diagram showing the control system for the motorcycle including the dual clutch transmission apparatus according to a preferred embodiment of the present invention. In FIG. 2, the body of the engine is not illustrated.

In the control system (control apparatus) 10 shown in FIG. 2, control unit 300 includes TCU (transmission control unit) 110 and ECU (engine control unit) 120. Between transmission control unit 110 and engine control unit 120, various sorts of data are exchanged as information by data communication such as CAN communication.

That is, information inputted to transmission control unit 110 through CAN communication is inputted to engine control unit 120, and information inputted to engine control unit 120 is also inputted to transmission control unit 110 through CAN communication. Thus, transmission control unit 110 and engine control unit 120 share the inputted information with each other, transmission control unit 110 mainly controls driving of transmission 70, and engine control unit 120 controls driving of the engine.

Each of transmission control unit 110 and engine control unit 120 preferably includes a microcomputer and performs signal processing according to a program stored in advance in a ROM while using a temporary storage function of a RAM. A rewritable ROM may also be used for a storage function and may be used while being rewritten as required, for example.

Transmission control unit 110 and engine control unit 120 control driving of a motorcycle (portions of the vehicle including transmission mechanism 700, shift mechanism 701, the engine or the like) based on signals inputted from sensors and lever operation amount detection unit 92 that detects the amounts of operation of shift switch 106 and clutch lever 91 provided in the motorcycle.

A plurality of sensors are connected to transmission control unit 110. FIG. 2 shows clutch lever 91, accelerator opening sensor 101 (accelerator position sensor), clutch position sensors 102 and 103 (clutch angle sensors), shift position sensor 105 (transmission gear detection unit), shift switch 106, drive shaft rotational speed detecting sensor 111 (referred to as "vehicle speed sensor") and throttle opening sensor 121 in the sensors connected to transmission control unit 110.

Clutch lever 91 is gripped by the driver, to thereby adjust the engagement state of the clutches. For example, clutch lever 91 is disposed on the left side handlebar of the handle and the driver can have a left-hand grip and universal grip.

Clutch lever 91 is preferably operated by a by-wire system, for example. The amount of operation on the lever gripped by the driver is detected by lever operation amount detection unit 92.

Lever operation amount detection unit 92 converts the detected lever operation amount into an electrical signal and outputs this signal to control unit 300 (more specifically transmission control unit 110).

Information inputted from sensors 101 to 103, 105, 111, and 121 and shift switch 106 to transmission control unit 110 is the accelerator opening, the clutch positions of first clutch 74 and second clutch 75 (the relative position of the drive-side portion and the first main shaft-side portion of each clutch), the rotational speed of drive shaft 730, the opening of an electromagnetic throttle (the position of throttle valve 131 of an electromagnetic throttle).

Various kinds of information other than those from sensors 101 to 103, 105, 111, and 121 and shift switch 106 preferably are inputted to transmission control unit 110 by other sensors and elements not illustrated. For example, information including the rotational speed of first main shaft 710 (shown as "odd-numbered gear main shaft rotational speed" in FIG. 2), the rotational speed of second main shaft 720 (shown as "even-numbered gear main shaft rotational speed" in FIG. 2), the rotational angle of shift cam 14 and the rotational speed of crankshaft 60 (engine (EG) rotational speed) is inputted to transmission control unit 110.

Further, cylinder discrimination information, side stand switch (side stand SW) information and neutral switch (neutral SW) information indicating that the transmission gears are in a neutral position are inputted to transmission control unit 110 from a cylinder discrimination sensor (cam sensor), a side stand switch and a neutral switch, which are not illustrated.

Engine control unit 120 is also connected to electronically controlled throttle 130, injector 133 of the engine and ignition 127. The engine is controlled by using these connected components. Information including the intake air temperature, the water temperature and the intake air negative pressure is inputted to engine control unit 120 from connected sensors.

Accelerator opening sensor 101 (accelerator position sensor) detects the amount of a driver's operation of the accelerator and outputs the detected operation amount to transmission control unit 110. According to this accelerator operation amount, transmission control unit 110 and engine control unit 120 control driving of the components.

Clutch position sensors 102 and 103 (clutch angle sensors) detect the state of engagement in first clutch 74 attained by first clutch actuator 77 and the state of engagement in second clutch 75 attained by second clutch actuator 78 (also referred to as "clutch position"). The detected clutch positions (the degrees of transmission of torques by the clutches) are outputted to transmission control unit 110.

More specifically, clutch position sensor 102 detects the angle of rotation of motor 77b according to the amount of operation of first pull rod 77a. Clutch position sensor 102 can detect the angle of rotation of motor 77b to thereby detect the amount of separation between the plurality of clutch plates and the plurality of friction plates adjusted according to the amount of operation of first pull rod 77a, i.e., the state of engagement in first clutch 74. Clutch position sensor 103 also has the same function as that of clutch position sensor 102, and detects the angle of rotation of motor 78b corresponding to the amount of operation of second pull rod 78a to thereby detect the state of engagement in second clutch 75. That is, clutch position sensor 103 detects the amount of separation between the plurality of clutch plates and the plurality of friction plates in second clutch 75, i.e., the state of engagement (clutch position) in second clutch 75, and outputs the detected amount to transmission control unit 110.

Output shaft rotational speed detecting sensor 111 (referred to as "vehicle speed sensor") detects the rotational speed of drive shaft 730 of transmission 70 (the drive shaft rotational speed corresponding to the vehicle speed) and outputs the detected rotational speed to transmission control unit 110 and engine control unit 120.

Shift position sensor 105 (transmission gear detection unit) detects the position of predetermined transmission gears (the first to sixth speeds, neutral) by the operation of motor 140 in shift mechanism 701 and outputs the detected gear position to transmission control unit 110.

Shift switch 106 preferably includes a shift-up button and a shift-down button that is not illustrated, and transmission 70 is operated by the pressing the shift-up button or shift-down button.

In other words, a signal indicating that the button has been depressed (hereinafter referred to as "shift signal") is output from shift switch 106 to transmission control unit 110 (control unit 300) when the driver presses the shift-up button or the shift-down button of shift switch 106. Control unit 300 controls motor 140 based on this shift signal to rotate shift cam 14 so that shift forks 141 to 144 are driven as desired, to thereby perform a transmission gear changing operation (gear shifting) in transmission 70 (particularly, transmission mechanism 700).

In the present preferred embodiment, a shift-up operation from the present transmission gear is executed in transmission 70 in response to depressing of the shift-up button by the driver, and a shift-down operation from the present transmission gear is executed in transmission 70 in response to depressing of the shift-down button by the driver.

First clutch actuator 77 adjusts an engaging force applied to first main shaft 710 in first clutch 74, i.e., a torque transmitted from first clutch 74 to first main shaft 710, based on a control command from transmission control unit 110. Transmission or blocking of power from the engine to first main shaft 710 is performed in this way to cause the vehicle to start or stop.

First clutch actuator 77 in the present preferred embodiment changes the torque capacity of first clutch 74 through hydraulic pressure to adjust the torque transmitted through first clutch 74. In first clutch actuator 77, motor 77b drive-controlled by transmission control unit 110 drives master cylinder 77d through a link 77c to feed a hydraulic operating fluid to slave cylinder 77e.

By the hydraulic operating fluid flowing into slave cylinder 77e, first pull rod 77a urged toward first clutch 74 is moved in the direction of moving away from first clutch 74 side. The engaging force, i.e., the transmitted torque capacity (hereinafter referred to as "torque capacity"), in first clutch 74 is thereby reduced to block a torque transmitted from the engine (more specifically from crankshaft 60) to first main shaft 710. With the movement of first pull rod 77a in a manner of being drawn in the direction of moving away from first clutch 74 as described above, first clutch 74 is made free (released). Also, first pull rod 77a driven by motor 77b is released from the state of being drawn in the direction of moving away from a side of first clutch 74 to move toward first clutch 74 side.

The engaging force of first clutch 74 (in other words, the clutch torque capacity) is thereby increased, so that the torque transmitted from the engine to first main shaft 710 is increased. First clutch 74 transmits the torque from the engine to first main shaft 710.

Second clutch actuator 78 changes an engaging force applied to second main shaft 720 in second clutch 75, i.e., the torque capacity of second clutch 75, based on a control command from transmission control unit 110, thereby adjusting a torque transmitted from second clutch 75 to second main shaft 720. Transmission or blocking of power from the engine to second main shaft 720 is performed in this way to cause the vehicle to start or stop.

Second clutch actuator 78 preferably has a construction similar to that of first clutch actuator 77 and drives second clutch 75 by the same operation as that by which first clutch actuator 77 drives first clutch 74.

Further, first clutch actuator 77 and second clutch actuator 78 operate the transmission during driving by operating first clutch 74 and second clutch 75 to change a torque transmission path inside the transmission.

While first clutch actuator 77 and second clutch actuator 78 are assumed to be preferably hydraulic in this description, first clutch actuator 77 and second clutch actuator 78 may be of any other type, e.g., electric if they are constructed so as to adjust the engaging forces applied to the clutches (equivalent to "transmitted torque capacity of the clutch").

In shift mechanism 701, motor 140 drives based on a control command from transmission control unit 110 in response to an input from shift switch 106 to drive shift cam drive apparatus 800 through transfer mechanism 41. By driving with shift cam drive apparatus 800, shift cam 14 is driven and rotated. With the rotation of shift cam 14, shift forks 141 to 144 (see FIG. 1) mounted in the transmission are selectively operated. At least one of first main shaft 710 and second main shaft 720, which are transmission input shafts, and drive shaft 730 are thereby connected through the desired one of the pair of gears to define the predetermined transmission gear.

Throttle opening sensor 121 detects the opening of throttle valve 131 of electronically controlled throttle 130 and outputs a signal representing the opening to transmission control unit 110. Transmission control unit 110 performs transmission control by using the opening of the throttle valve (throttle opening) inputted from throttle opening sensor 121 and outputs the throttle opening to engine control unit 120 to enable feedback control.

Electronically controlled throttle 130 drives based on a control command from engine control unit 120. Electronically controlled throttle 130 drives motor 132 to adjust the opening of throttle valve 131 provided in the engine air intake system.

Engine control unit 120 controls drive of the engine based on information inputted through transmission control unit 110, the information including the opening of throttle valve 131, the rotational speed of the engine and the accelerator operation amount. In this control, engine control unit 120 controls the torque of the engine according to a command with a target engine torque to determine the torque of the engine, the command being inputted from transmission control unit 110. This required torque is controlled, for example, on the basis of a three-dimensional MAP to calculate the throttle valve opening based on information from the APS (accelerator opening (position) sensor) 101 and the engine rotational speed (corresponding to the rotational speed of crankshaft 60). By this control, in a region called "over venturi", a reduction in an intake air flow rate is prevented by limiting the throttle opening to improve the charging efficiency. Additionally, in a region where the torque rises, the throttle opening is also limited. This elaborates an overall torque characteristic.

Based on the target engine torque command inputted as described above, engine control unit 120 controls the torque produced by the engine by operating electronically controlled throttle 130 or by changing ignition timing with ignition 127. The target engine torque is calculated in transmission control unit 110. However, calculation of a target engine torque may alternatively be performed in engine control unit 120.

At the start of the drive operation, transmission control unit 110 controls the operations of first clutch actuator 77, second clutch actuator 78 and shift mechanism 701 according to predetermined timing by receiving the amount of lever operation on clutch lever 91 and a shift signal of shift switch 106, in addition to outputs of a required torque based on inputted signals. By the operations of first clutch actuator 77, second clutch actuator 78 and shift mechanism 701, first clutch 74, second clutch 75 and the transmission gears are operated to perform a transmission gear change operation.

During the drive operation, transmission control unit 110 receives the lever operation amount information from lever operation amount detection unit 92 and a transmission gear command from shift switch 106, and calculates a target engine torque and a target clutch torque based on inputted information items (the accelerator opening, the engine rotational speed, the rotational speed of first main shaft 710, the rotational speed of second main shaft 720, the rotational speed of drive shaft 730 and the angle of rotation of the shift cam). Transmission control unit 110 calculates a target throttle opening, a target rotation angle of shift cam 14, and a target clutch position in first clutch 74 or second clutch 75 based on the calculated target engine torque and target clutch torque. Transmission control unit 110 controls driving of first clutch actuator 77, second clutch actuator 78 and motor 140 by using the results of these calculations to change the torque transmission path in transmission 70.

In other words, during a transmission period, transmission control unit 110 increases to the target value the clutch torque capacity of the clutch on the next gear side that transmits a torque to the pair of gears in the target transmission gear (the transmission gear after interchange (next gear)), and thereafter reduces the clutch torque capacity of the clutch on the preceding gear side that transmits a torque to the pair of gears in the transmission gear before interchange (preceding gear), thereby changing the torque transmission path.

At the start of moving the vehicle, transmission control unit 110 causes the vehicle to start by controlling first clutch actuator 77, second clutch actuator 78 and motor 140 in shift mechanism 701 in association with engine drive control performed by engine control unit 120.

When performing this vehicle start control, transmission control unit 110 first controls transmission mechanism 700 so that each of the odd-numbered transmission gear mechanism and even-numbered transmission gear mechanism is in a meshing state so as to have the highest gear ratio. More specifically, transmission control unit 110 selects the second gear and the first gear (2-1 state) through shift mechanism 701 and increases the torque capacity of second clutch 75 through second clutch actuator 78 so that a torque is transmitted to the second gear.

Thereafter, transmission control unit 110 controls drive of two clutches 74 and 75 to perform a transmission gear change operation at the start of the drive operation, i.e., a clutch interchange operation at the start of the drive operation (hereinafter referred to as "starting clutch interchange control"). At the start of operation, transmission control unit 110 performs an interchange by controlling clutch torques depending on the clutch rotational speed difference on the lower gear (first gear) side so that the clutch torque on the higher gear (second gear) side is reduced exponentially and the clutch torque on the lower gear side is increased exponentially. The clutch rotational speed difference referred to is a difference in rotational speed between the drive side (corresponding to the upstream side of the power transmission path in the clutch) and the first main shaft side (the downstream side in the power transmission path in the clutch) in the single clutch.

The functions of transmission control unit 110 that performs such start control will be described.

Figure 3:
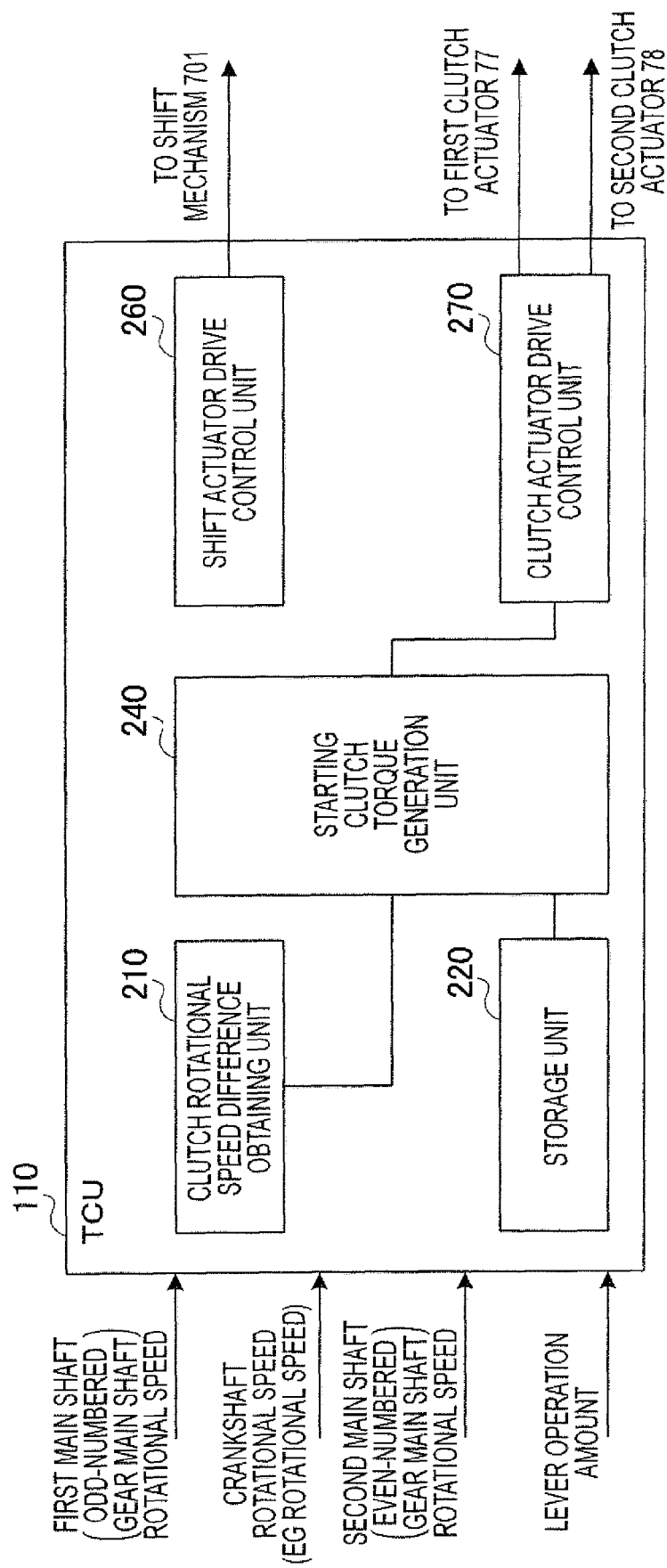
FIG. 3 is a function block diagram explaining a start control using a transmission control unit in the dual clutch transmission apparatus according to a preferred embodiment of the present invention.

FIG. 3 is a function block diagram for explaining start control performed by the transmission control unit in the dual clutch transmission apparatus according to a preferred embodiment of the present invention.

Transmission control unit (TCU) 110 includes clutch rotational speed difference obtaining unit 210, storage unit 220, starting clutch torque generation unit 240, shift actuator drive control unit 260 and clutch actuator drive control unit 270.

Clutch rotational speed difference obtaining unit 210 obtains the difference between the rotational speed (rotational speed difference) at the upstream side (drive side) and the rotational speed at the downstream side (first main shaft side) in the power transmission path in each clutch drive-controlled by transmission control unit 110 based on the first main shaft rotational speed, the second main shaft rotational speed and the engine rotational speed inputted thereto. The clutch rotational speed difference obtained in this way is outputted to starting clutch torque generation unit 240.

At the start of the drive operation, clutch rotational speed difference obtaining unit 210 calculates the rotational speed difference in first clutch 74 (referred to as "clutch 1 rotational speed difference" in some cases) and outputs the calculated rotational speed difference to starting clutch torque generation unit 240.

More specifically, clutch rotational speed difference obtaining unit 210 calculates the rotational speed difference between the inputted rotational speed of first main shaft 710 on the first main shaft side (rotational speed downstream of the clutch) and the rotational speed upstream the clutch obtained by multiplying the rotational speed of crankshaft 60 (engine rotational speed) via the primary gear reduction ratio in first clutch 74 at the start of operation. Clutch rotational speed difference obtaining unit 210 outputs the calculated clutch rotational speed difference in first clutch 74 to starting clutch torque generation unit 240.

Storage unit 220 stores data and a program used for drive control on transmission 70 in TCU 110. In particular, storage unit 220 stores a map that is read by clutch torque generation unit 240 at the start of operation of the vehicle, and that is set so that the thermal loads on two clutches 74 and 75 are minimized (equalized) depending on the clutch rotational speed difference (hereinafter referred to as "clutch thermal load equalization map").

This "clutch thermal load equalization map" is information used to start clutch interchange control on first clutch 74 and second clutch 75 (e.g., an expression of an exponential function). A gain (coefficient) of this exponential function is set according to the gear ratio between the first speed and the second speed.

Figure 5:
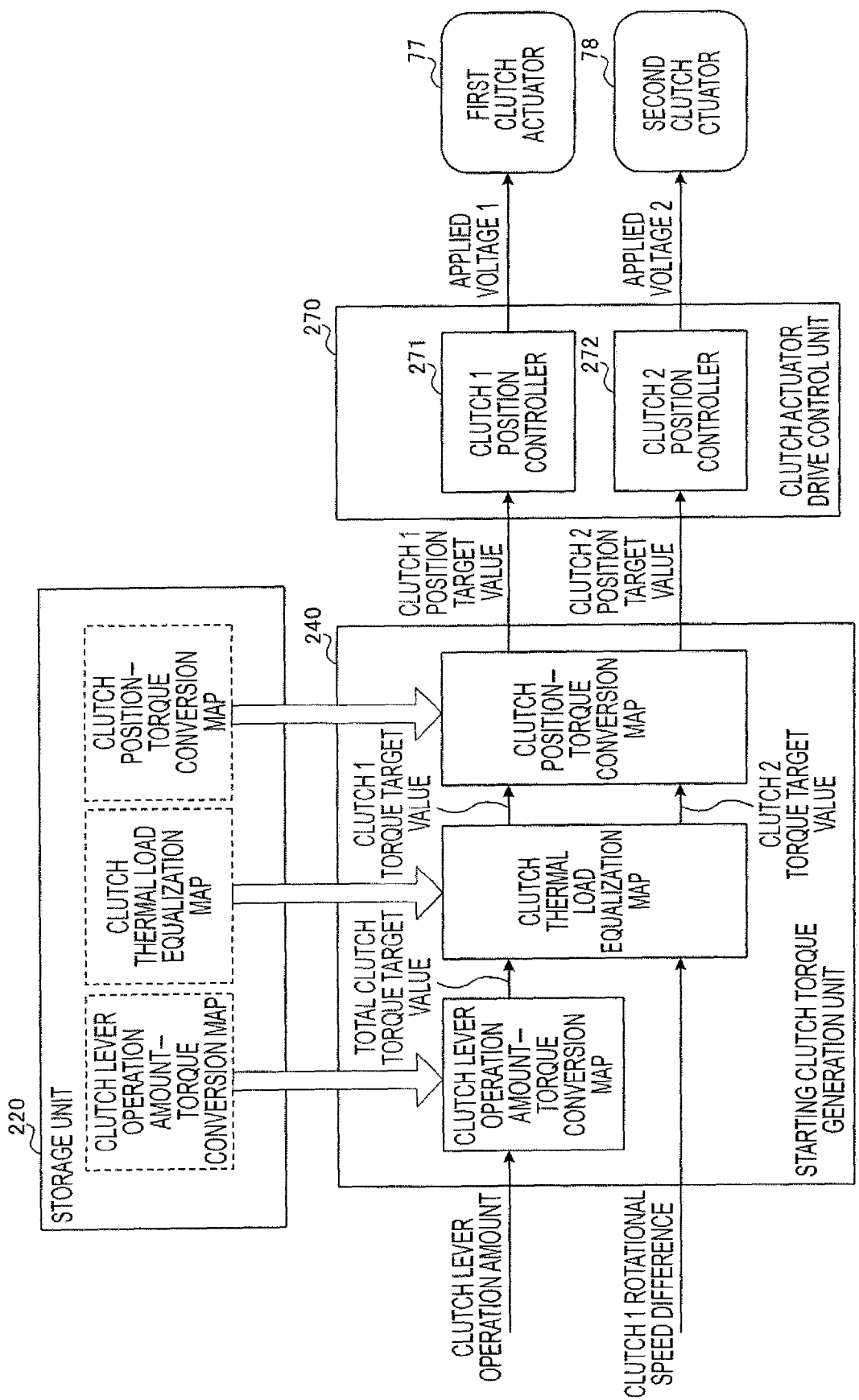
FIG. 5 is a diagram explaining a starting clutch torque generation unit in a preferred embodiment of the present invention.

Storage unit 220 also stores transmission gear ratio information indicating the ratios between the transmission gears, a "clutch lever operation amount-torque conversion map" (see FIG. 5) and a "clutch position-torque conversion map" (see FIG. 5).

The "clutch thermal load equalization map", "clutch lever operation amount-torque conversion map" and "clutch position-torque conversion map" are read by starting clutch torque generation unit 240, so as to be used for a calculation of clutch torque capacity command values (clutch position target values) with respect to first clutch 74 and second clutch 75 (so-called "shifting the clutch during the start of operation").

The "clutch thermal load equalization map" is a map that is set depending on the rotational speed difference in the clutch on the lower gear side so that the thermal loads on two clutches 74 and 75 are minimized (equalized). This "clutch thermal load equalization map" is a map determined in advance based on the rotational speed difference in first clutch 74 so that the thermal loads on the two clutches are equalized, and set by an exponential function, for example. If the clutch on the lower gear side is second clutch 75, the "clutch thermal load equalization map" is a map determined based on the rotational speed difference in second clutch 75 so that the thermal loads on the two clutches are minimized (equalized).

Figure 4:
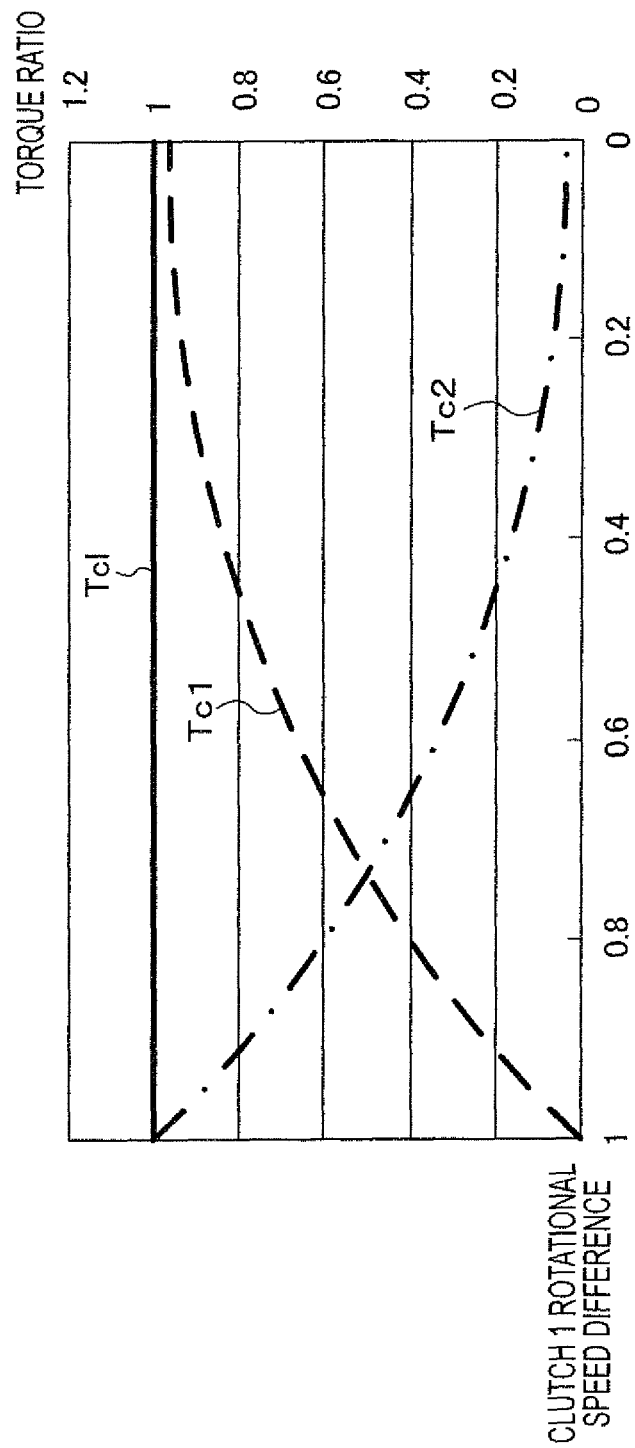
FIG. 4 is a diagram explaining a clutch thermal load equalization map stored in a storage unit.

FIG. 4 is a diagram for explaining the clutch thermal load equalization map stored in the storage unit. The "clutch thermal load equalization map" in FIG. 4 shows the ratios of the clutch torques in first clutch 74 and second clutch 75 as the total torque capacity (total torque value: Tcl) that is represented by 1, and the rotational speed difference (the rotational speed difference at which the vehicle starts moving is 1) in clutch 1 (first clutch).

The "clutch lever operation amount-torque conversion map" is a map in which the amount of operation of the clutch lever operated by the driver (lever operation amount) and the torque transmitted through the clutch (clutch torque) are associated with each other. This "clutch lever operation amount-torque conversion map" is used when a lever operation amount is converted into a total torque target value of the clutch torque (total clutch torque target value). The total torque target value is a value necessary to start the vehicle (a value at which the vehicle starts moving), i.e., a value at which the torque is transmitted to the drive wheel (rear wheel) to rotatingly drive the drive wheel so that the vehicle moves.

The "clutch position-torque conversion map" is a map in which torque target values for two clutches 74 and 75 are associated with target values of the clutch positions in the clutches (target values of clutch 1 and clutch 2). A torque target value is converted into a target value of the clutch position.

Using these maps, starting clutch torque generation unit 240 in TCU 110 calculates clutch torques (more specifically clutch position target values) and outputs the calculated clutch torques to clutch actuator drive control unit 270. Two clutches 74 and 75 are torque-controlled thereby.

Processing in starting clutch torque generation unit 240 will be described in detail.

FIG. 5 is a diagram for explaining a starting clutch torque generation unit according to a preferred embodiment of the present invention.

As shown in FIG. 5, starting clutch torque generation unit 240 in TCU 110 calculates a total clutch torque target value by converting a clutch lever operation amount inputted from clutch lever 91 into the total clutch torque target value by using the "clutch lever operation amount-torque conversion map" read out from storage unit 220. That is, a total clutch torque target value is calculated by the "clutch lever operation amount-torque conversion map" set in advance according to the operation of clutch lever 91.

Starting clutch torque generation unit 240 calculates transmitted torque target values for the clutches (clutch torque target values) by using the calculated total clutch torque target value, the clutch 1 (first clutch 74) rotational speed difference inputted from clutch rotational speed difference obtaining unit 210, and the "clutch thermal load equalization map" (see FIG. 4) read from storage unit 220. The transmitted torque target values for the clutches calculated in this way are a clutch torque target value for clutch 1 (first clutch 74) and a clutch torque target value for clutch 2 (second clutch 75) such that the thermal loads on first clutch 74 (clutch 1) and second clutch 75 (clutch 2) are equalized.

In other words, starting clutch torque generation unit 240 calculates, at the start of operation, clutch torque target values for the two clutches such that the thermal load (generated heat) on first clutch 74 when the first gear is selected and the thermal load on second clutch 75 when the second gear is selected are equalized via the "clutch thermal load equalization map" (see FIG. 4).

Further, starting clutch torque generation unit 240 converts the calculated clutch 1 target value and the clutch 2 target value into corresponding clutch positions by using the "clutch position-torque conversion map" read out from storage unit 220. That is, starting clutch torque generation unit 240 calculates a clutch 1 (first clutch 74) position target value corresponding to the clutch 1 target value and a clutch 2 (second clutch 75) position target value corresponding to the calculated clutch 2 target value by using the "clutch position-torque conversion map".

The calculated clutch 1 position target value corresponds to the transmitted torque (clutch torque) in first clutch 74 while the calculated clutch 2 position target value corresponds to the transmitted torque (clutch torque) in second clutch 75.

Starting clutch torque generation unit 240 outputs the calculated clutch 1 position target value to clutch position controller 271 in clutch actuator drive control unit 270, and outputs the calculated clutch 2 position target value to clutch position controller 272 in clutch actuator drive control unit 270.

Then, in clutch actuator drive control unit 270, clutch 1 position controller 271 outputs applied voltage 1 (drive voltage) to first clutch actuator 77, and clutch 2 position controller 272 outputs applied voltage 2 (drive voltage) to second clutch actuator 78 so as to drive-control two clutches 74 and 75.

When the clutch rotational speed difference (the clutch rotational speed difference in first clutch 74, which is the clutch on the lower gear side, in the present preferred embodiment) inputted from clutch rotational speed difference obtaining unit 210 is equal to zero or close to zero, starting clutch torque generation unit 240 outputs a command to effect engagement in the clutch on the lower gear side (first clutch 74) to clutch actuator drive control unit 270.

When the clutch rotational speed difference is zero or close to zero, clutch actuator drive control unit 270, receiving the engagement command, drives first clutch actuator 77 via clutch 1 position controller 271 to effect engagement in first clutch 74. Simultaneously, clutch actuator drive control unit 270 drives second clutch actuator 78 via clutch 2 position controller 272 to release the clutch on the hither gear side, i.e., second clutch 75 on the second gear side in the present preferred embodiment.

Thus, starting clutch torque generation unit 240 performs "starting clutch interchange" control by calculating transmitted torque (clutch torque capacity) command values to perform interchange between first clutch 74 and second clutch 75 from the clutch on the higher gear side to the clutch on the lower gear side for "starting clutch interchange" control based on the clutch lever operation amount and the clutch 1 rotational speed difference.

Starting clutch torque generation unit 240 calculates the transmission torque of clutches 74 and 75 (clutch position target values), which are clutch torque command values for clutches 74 and 75, by using the lever operation amount and the "clutch thermal load equalization map" (see FIG. 4), and by exponentially changing the torques depending on the clutch rotational speed difference on the lower gear side (clutch 1 rotational speed difference) so as to create a hyperbolic curve, as shown in FIG. 4.

This exponential function is set to change the torques transmitted by first clutch 74 and second clutch 75 depending on the clutch rotational speed difference (clutch 1 rotational speed difference) in first clutch 74, i.e., the clutch on the lower gear side (first speed side), so that the thermal loads on first clutch 74 and second clutch 75 are equalized.

Shift actuator drive control unit 260 controls shift mechanism 701 base on inputted information to select the transmission gears. More specifically, shift actuator drive control unit 260 drives shift mechanism 701 according to the shift signal inputted from shift switch 106 and, at the start of a predetermined drive operation, selects each of the first gear and the second gear.

Shift actuator drive control unit 260 decouples the dogs from the higher gear (second gear) through second clutch actuator 78 after engagement has been effected in first clutch 74 by clutch actuator drive control unit 270.

Clutch actuator drive control unit 270 drives first clutch actuator 77 and second clutch actuator 78 based on inputted information to control drive of first clutch 74 and second clutch 75. That is, the state of engagement in each of first clutch 74 and second clutch 75 (the state between the engaging state and the released state) is controlled by clutch actuator drive control unit 270. By this control, in each of first clutch 74 and second clutch 75, the torque transmitted through the clutch (the torque actually transmitted) is adjusted.

Drive of first clutch 74 and second clutch 75 with clutch actuator drive control unit 270 is performed according to, for example, the inputted shift signal together with drive of shift mechanism 701 with shift actuator drive control unit 260.

Clutch actuator drive control unit 270 shifts from the clutch on the higher gear side to the clutch on the lower gear side by driving first clutch actuator 77 and second clutch actuator 78 according to the command values ("starting clutch shifting") received from starting clutch torque generation unit 240. At this time, clutch actuator drive control unit 270 controls two clutches 74 and 75 depending on the clutch rotational speed difference on the lower gear side by exponentially changing the torques transmitted through the two clutches so as to create hyperbolic curves.

At the start of operation, clutch actuator drive control unit 270 receiving the command values from starting clutch torque generation unit 240 first increases the torque capacity (transmitted torque) of second clutch 75 on the higher gear (second gear) side through second clutch actuator 78.

Clutch actuator drive control unit 270 then shifts the clutch by increasing the torque transmitted through first clutch 74 on the lower gear (first gear) side through first clutch actuator 77 while reducing the torque transmitted through second clutch 75 to the drive shaft 730 side through second clutch actuator 78.

During this clutch shifting, clutch actuator drive control unit 270 exponentially changes the torques transmitted through first clutch 74 and second clutch 75 depending on the clutch rotational speed difference in first clutch 74 so that the thermal loads on first clutch 74 and second clutch 75 are equalized, and so that the value of the torque transmitted through first clutch 74 is approximated to the torque target value corresponding to the lever operation amount in the vicinity of the clutch rotational speed difference 0 in first clutch 74.

Thus, clutch actuator drive control unit 270 exponentially increases the torque transmitted through first clutch 74 while gradually reducing the increase rate, and exponentially reduces the torque transmitted through second clutch 75 while gradually reducing the reduction rate.

This control enables even distribution of a thermal load to the clutches when starting operation of the vehicle using half-clutch control on first clutch 74 and second clutch 75. Thus, a thermal load on one clutch can be reduced to enable the clutch itself to be reduced in size. This effect cannot be achieved in a transmission of the conventional construction in which one clutch unit is driven to start the operation thereof.

Figure 6:
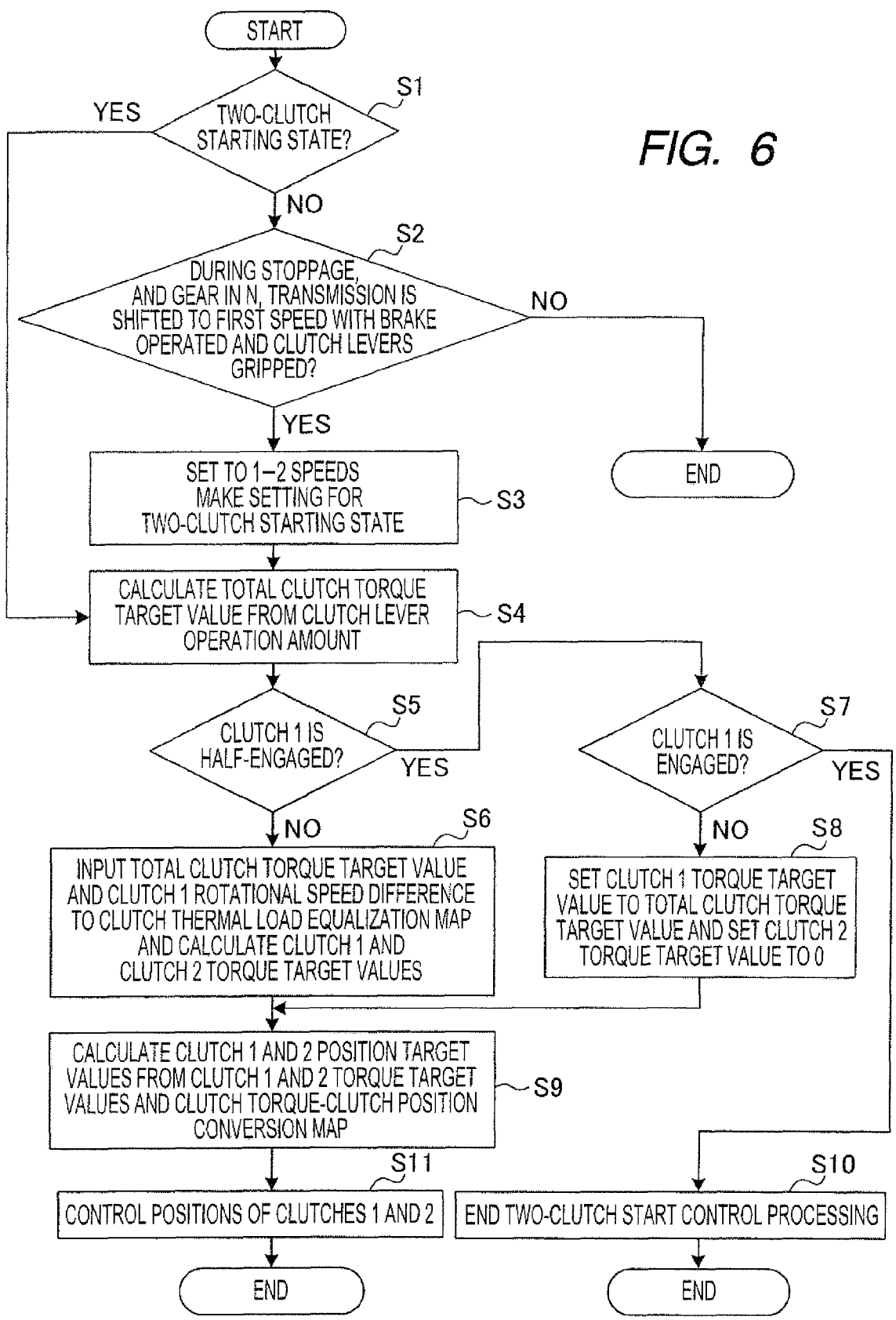
FIG. 6 is a flowchart showing control when starting a vehicle by the transmission control unit.

FIG. 6 is a flowchart showing control at the start of moving the vehicle in the transmission apparatus according to the present preferred embodiment. "Clutch 1" and "clutch 2" in FIG. 6 refer to first clutch 74 and second clutch 75, respectively.

In step S1, as shown in FIG. 6, transmission control unit 110 (more specifically starting clutch torque generation unit 240) determines whether or not the transmission is in a two-clutch-start standby state based on inputted information. If not in the two-clutch-start standby state, the process proceeds to step S2. If in the two-clutch-start standby state, the process proceeds to step S4.

The two-clutch-start standby state in this step S1 is a state in which the odd-numbered and even-numbered transmission gears are respectively set to the first and second speeds, i.e., the two clutches 74 and 75 are released, and the engine is idling.

In step S2, transmission control unit 110 (starting clutch torque generation unit 240) determines whether or not the present state is stoppage, each transmission gear is set in the neutral (N) position, and an operation (shift switch operation) to shift to the first speed has been performed while a braking operation and gripping of clutch lever 91 are being performed. If the above-described conditions are satisfied in step S2, the process proceeds to step S3.

That is, in step S2, transmission control unit 110 (starting clutch torque generation unit 240) determines whether or not an operation to shift up to the first speed is to be performed based on the signals from sensors 101 to 103, 105, 111, and 121 and shift switch 106, the lever operation signal from lever operation amount detection unit 92 and the shift-up signal from shift switch 106.

In step S3, transmission control unit 110 (starting clutch torque generation unit 240) sets the respective transmission gears to the first-gear and second-gear positions ("1-2" gearing-in). That is, shift mechanism 701 is driven by shift actuator drive control unit 260 to select and engage both the first and second gears.

In step S4, transmission control unit 110 (starting clutch torque generation unit 240) calculates a total clutch torque target value from the clutch lever operation amount indicated by the inputted lever operation signal and the clutch torque conversion map, and the process proceeds to step S5.

In step S5, transmission control unit 110 (starting clutch torque generation unit 240) determines whether or not first clutch 74 is in a half-engaging state. If first clutch 74 is not in any half-engaging state, the process proceeds to step S6. If first clutch 74 is in a half-engaging state, the process proceeds to step S7.

In step S6, after starting clutch torque generation unit 240 calculates a clutch torque target value for first clutch 74 and a clutch torque target value for second clutch 75 by inputting the total clutch torque target value and the clutch rotational speed difference in first clutch 74 to the clutch thermal load equalization map, the process then proceeds to step S9.

In step S7, starting clutch torque generation unit 240 determines whether or not first clutch 74 (clutch 1) is in an engaging state. If first clutch 74 is not in the completely engaging state, the process proceeds to step S8. If first clutch 74 is in the completely engaging state, the process proceeds to step S10, two-clutch start control processing ends and then the process ends.

In step S8, starting clutch torque generation unit 240 sets the clutch torque target value for the first clutch (clutch 1) to the total clutch torque target value (the value necessary for starting the vehicle) and also sets the clutch torque target value for the second clutch (clutch 2) to zero, and the process proceeds to step S9. The value necessary to start the vehicle is a value at which the torque is transmitted to the rear wheel through drive shaft 730 to rotatingly drive the rear wheel so that the vehicle moves.

In step S9, starting clutch torque generation unit 240 calculates a clutch position target value for first clutch 74 (clutch 1) and a clutch position target value for second clutch 75 (clutch 2) from the clutch torque target value for first clutch 74 (clutch 1), the clutch torque target value for second clutch 75 (clutch 2) and the clutch torque-clutch position conversions map, and the process proceeds to step S11.

In step S11, starting clutch torque generation unit 240 in transmission control unit 110 controls the positions of first clutch 74 and second clutch 75.

More specifically, in step S11, starting clutch torque generation unit 240 inputs the calculated clutch position target values for first clutch 74 (clutch 1) and second clutch 75

(clutch 2) to clutch 1 controller 271 and clutch 2 controller 272 in clutch actuator drive control unit 270. Clutch actuator drive control unit 270 then applies voltages 1 and 2 to first clutch actuator 77 and second clutch actuator 78, respectively, to drive first clutch 74 and second clutch 75 to thus control the positions (clutch positions). This control loop is executed periodically (e.g., at intervals of about 5 ms).

Figure 7:
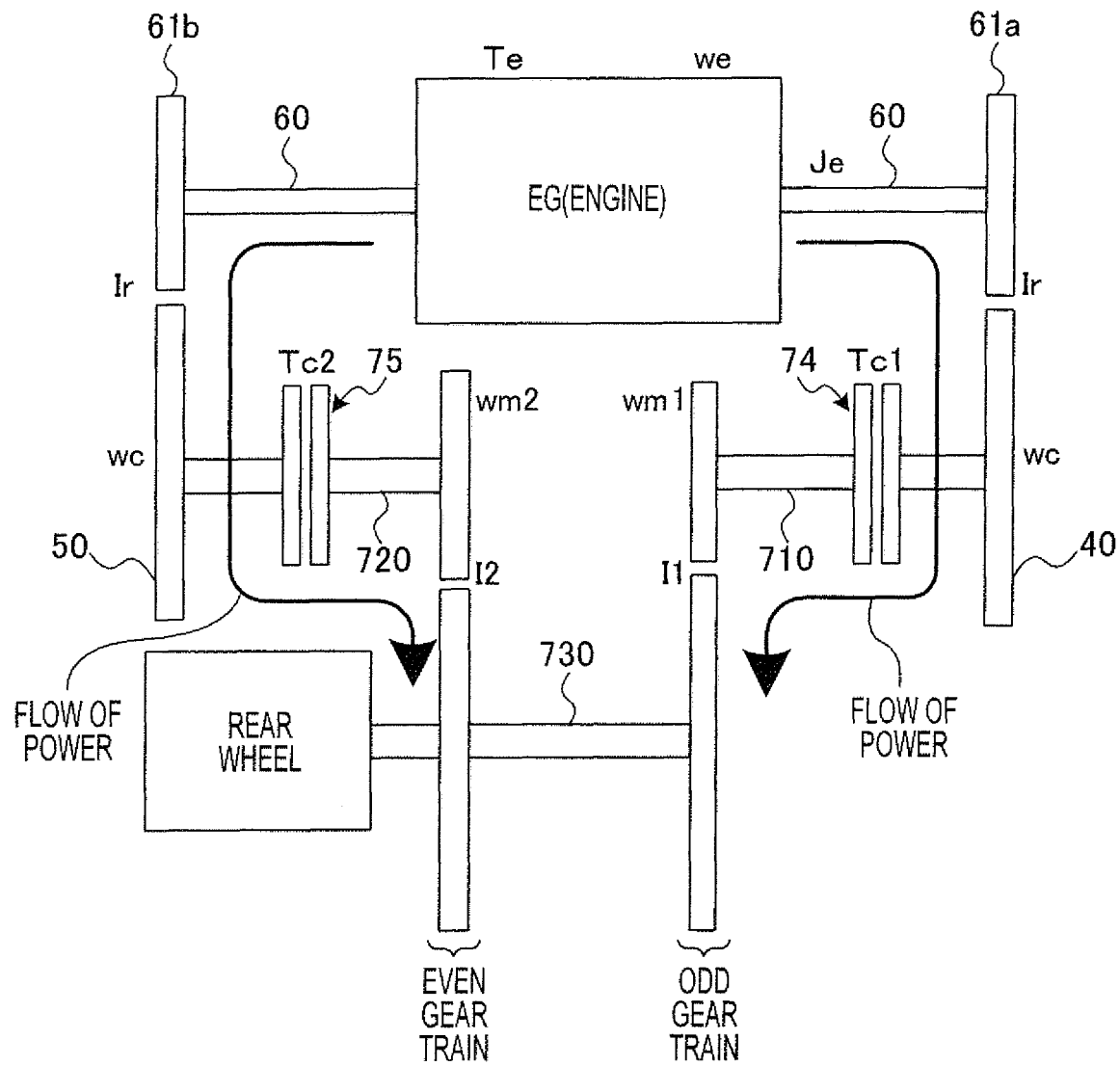
FIG. 7 is a schematic diagram explaining starting control in the dual clutch transmission apparatus in a preferred embodiment of the present invention.
Figure 8:
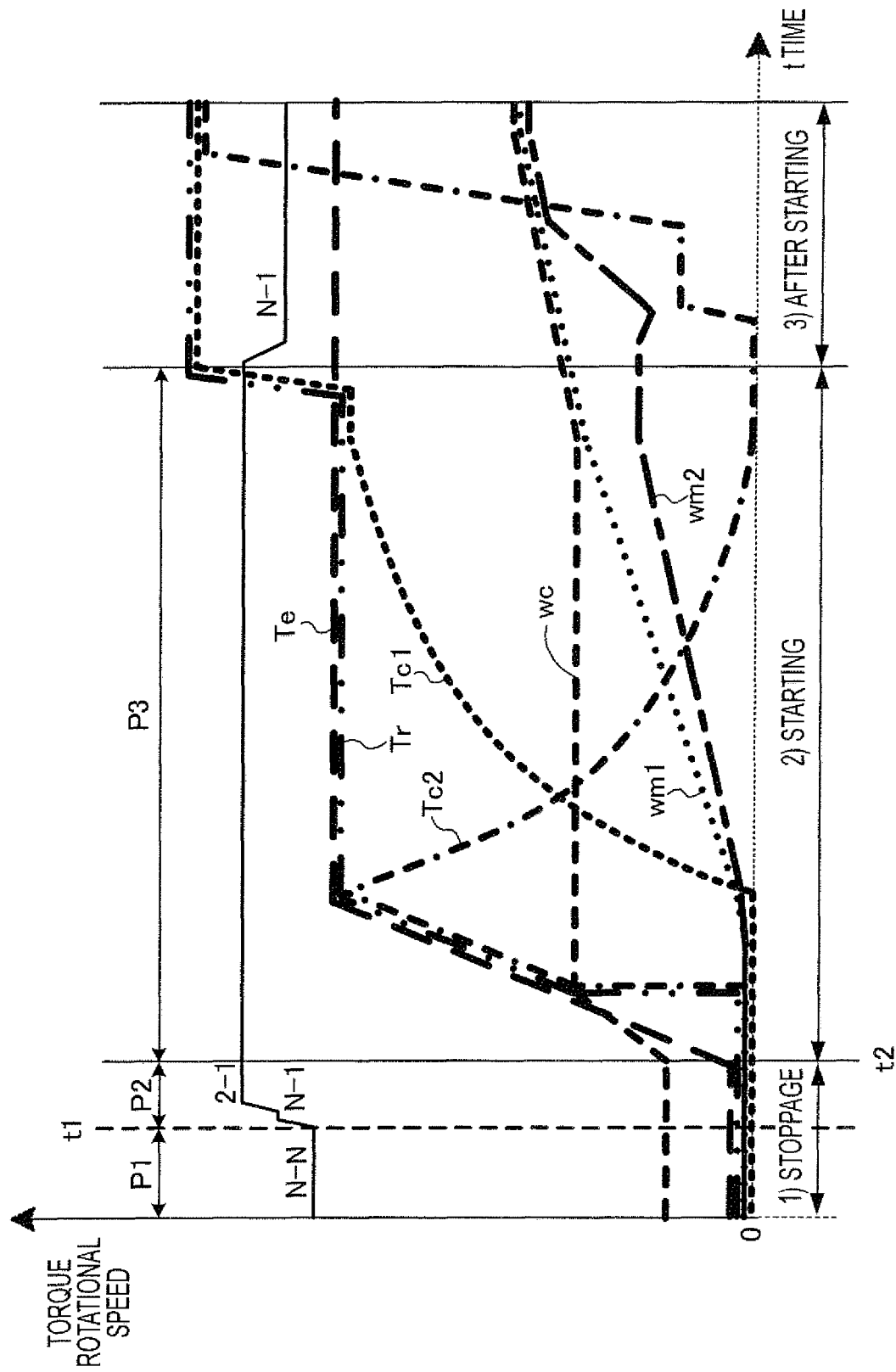
FIG. 8 is a timing chart showing changes in the transmitted torque capacities of clutches in the dual clutch transmission apparatus according to a preferred embodiment of the present invention when controlling a drive operation of the vehicle.

FIG. 7 is a schematic diagram of the transmission for explanation of start control in the dual clutch transmission apparatus according to a preferred embodiment of the present invention. FIG. 8 is a timing chart showing changes in the transmitted torque capacities of the clutches in the dual clutch transmission apparatus according to a preferred embodiment of the present invention when the drive operation of the vehicle is controlled.

In FIGS. 7 and 8, Tc1 represents the torque capacity of first clutch 74 (corresponding to "the torque transmitted through the clutch"); Tc2, the torque capacity of second clutch 75; Te, the engine (EG) torque clutch shaft (main shaft) converted value; and Ir, the primary gear reduction ratios of the clutches. Also, the gear reduction ratio for the first speed on first clutch 74 side is represented by, for example, the gear reduction ratio I1 on the first speed side, and the gear reduction ratio for the second speed on second clutch 75 side is represented by, for example, the gear reduction ratio I2 on the second speed side. Further, each of the input rotational speeds inputted to the clutches after primary gear reduction through input gears 40 and 50, i.e., the primary rotational speed of each clutch, is expressed by $\omega c(Te \times Ir)$. In FIGS. 7 and 8, "$\omega$" is represented by "w".

Also, $\omega m1$ represents the rotational speed at the downstream side (first main shaft side) in the clutch on the first speed side (first clutch 74), i.e., the rotational speed at the secondary side of first clutch 74, and $\omega m2$ represents the rotational speed at the downstream side (first main shaft side) in the clutch on the second speed side (second clutch 75), i.e., the rotational speed at the secondary side of second clutch 75. Also, in FIG. 8, Tr represents the total clutch torque (corresponding to the operation of clutch lever 91).

The control apparatus (more particularly transmission control unit 110 and engine control unit 120) controls transmission 70 in correspondence with the states: "1) stoppage", "2) starting" and "3) after starting" of the vehicle, as indicated in periods: before-starting stoppage period P1, two-clutch start preparatory state period P2, and starting period P3. The "1) stoppage" state of the vehicle corresponds to the above-described "two-clutch start standby state".

First, in the stoppage state before the start of a drive operation, i.e., "1) stoppage" of the vehicle, transmission control unit 110 moves each of the odd-numbered and even-numbered transmission gears to the N (neutral) position and releases first clutch 74 and second clutch 75.

At this time, the engine is maintained in an idling state in stoppage by engine control unit 120, and an input signal indicating a driver's operation is awaited.

At time t1, when clutch lever 91 is gripped and a shift-up operation (an operation on the shift switch or the shift pedal) is performed, transmission gears are shifted to 1-2 (geared in for the first and second speeds), thereby completing the shift operation.

That is, at time t1, transmission control unit 110 moves first clutch 74, second clutch 75 and the transmission gears via first clutch actuator 77, second clutch actuator 78 and drive motor 140 of shift mechanism 701 in response to the input signals from lever operation amount detection unit 92 and shift switch 106. First clutch 74 and second clutch 75 are thereby released. Simultaneously, the first gear, which is a transmission gear on first clutch 74 side, is set (geared in), and the second gear, which is a transmission gear on second clutch 75 side, is set, thereby completing a gear shift.

When the driver operates the accelerator and clutch lever 91 (at point t2), the signals indicating this operation are inputted from accelerator opening sensor 101 and lever operation amount detection unit 92 to transmission control unit 110. When the accelerator achieves a value equal to or larger than a predetermined threshold value, transmission control unit 110 starts the drive operation of the vehicle in cooperation with engine control unit 120 by using the input signals and a "clutch lever operation amount-torque characteristic" map.

In other words, at the time the drive operation is controlled, transmission control unit 110 converts the lever operation amount into a torque and calculates the converted value as a total clutch torque target value. Transmission control unit 110 calculates and sets a clutch torque target value for first clutch 74 and clutch torque target value for second clutch 75 based on the calculated total clutch torque target value, the "map for making the thermal loads in the clutches even" and the rotational speed difference in first clutch 74.

Transmission control unit 110 thereafter drives first clutch 74 and second clutch 75 via first clutch actuator 77 and second clutch actuator 78 so that the calculated clutch torque target value for first clutch 74 and the calculated clutch torque target value for second clutch 75 are reached.

First clutch 74 is controlled so that when the rotational speed difference in first clutch becomes close to 0, the clutch torque target value for first clutch 74 becomes equal to the total clutch torque target value (total torque target value), and second clutch 75 is controlled so that when the rotational speed difference in first clutch becomes close to 0, the clutch torque target value for second clutch 75 becomes equal to 0. As a result, in "3) after starting", acceleration at the first speed is performed.

When controlling the start of a drive operation, transmission control unit 110 drives second clutch 75 to change clutch torque capacity (hereinafter referred to as "torque capacity") Tc2 of second clutch 75 to total clutch torque Tr at which the vehicle starts moving (the drive operation of the vehicle started). Subsequently, transmission control unit 110 gradually reduces torque capacity Tc2 of second clutch 75 from the state in which torque capacity Tc2 of second clutch 75 is set to total clutch torque Tr, thereby changing this torque capacity to the torque target value 0 when completing shifting at the start of the drive operation.

This reduction in torque capacity Tc2 of second clutch 75 is such that torque capacity Tc2 is exponentially reduced according to the rotational speed difference ($\omega c - \omega m1$) in the clutch on the lower gear (first speed) side (first clutch 74) in relation to the torque capacity of clutch 74 increasing exponentially. The torque capacities of two clutches 74 and 75 are controlled by using an exponential function with a time constant set according to the gear ratio so that thermal losses in two clutches 74 and 75, i.e., the thermal loads, are equalized, and so that a shock does not occur at the time of engagement in first clutch 74 on the first speed side.

In other words, transmission control unit 110 drives second clutch 75 while in the state where first clutch 74 is released, and increases the clutch torque of second clutch 75 along with an increase in engine torque until a predetermined value (a rotational speed substantially equal to that at which the vehicle starts at the first speed) is reached.

Subsequently, transmission control unit 110 gradually releases second clutch 75 transmitting the clutch torque, i.e., reduces the torque capacity of second clutch 75, while simultaneously gradually increasing the torque capacity of first clutch 74. At this time, the torque capacities of two clutches 74 and 75 are controlled so as to change exponentially depending on the clutch rotational speed difference in first clutch 74 so that the thermal loads on the two clutches are equalized. The time constant of this exponential function is set according to the gear ratios of first clutch 74 and second clutch 75. With regard to the exponential function, the torque of first clutch 74 gradually becomes closer to the total clutch torque when completing shifting at the start of the drive operation.

Thus, at the start of the drive operation, the thermal load produced during the engaging operation of the clutch, i.e., the operation to change the transmitted torque (the clutch torque capacity) can be divided among a plurality of clutches, so that the thermal load per clutch can be reduced. Thus, the durability of the clutches can be improved by reducing the thermal load per clutch at the start of the drive operation, and the transmission itself, including dual clutches, can also be reduced in size and in weight by reducing the size of each clutch. Also, the vehicle itself, having this transmission, can be reduced in weight and the space in which the transmission is mounted can be reduced.

In the present preferred embodiment, first clutch 74 preferably functions as a clutch on the lower transmission gear side at the start of the drive operation of the vehicle, while second clutch 75 preferably functions as a clutch on the higher transmission gear side. However, the present invention is not limited thereto. In other words, second clutch 75 and first clutch 74 may be operated as the clutch on the lower transmission gear side and the clutch on the higher transmission gear side, respectively, and it is possible to shift from a transmission gear on the second clutch 75 side (second gear) to a transmission gear on the first clutch 74 side (first gear). In this case, the two clutches are shifted by gradually reducing the torque capacity of first clutch 74 according to the clutch rotational speed difference between the rotational speeds at the drive and first main shaft sides in second clutch 75, while at the same time gradually increasing the clutch torque capacity of second clutch 75.

The disclosed contents of the specification, drawings and abstract contained in Japanese Patent Application No. 2010-120791, filed on May 26, 2010 are incorporated herein by reference in their entirety.

The dual clutch transmission apparatus and the start control method according to various preferred embodiments of the present invention provide the advantages of reducing the thermal loads on the clutches at the start of the drive operation and thereby improving the durability and reducing the weight of each clutch, and are useful as a control unit mounted on a motorcycle having a dual clutch transmission, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A dual clutch transmission apparatus comprising:
a first clutch that transmits or interrupts torque from a crankshaft to a first main shaft;
a second clutch that transmits or interrupts torque from the crankshaft to a second main shaft;
an output shaft to which the torque on the first main shaft is transmitted through an odd-numbered transmission gear mechanism, and to which the torque on the second main shaft is transmitted through an even-numbered transmission gear mechanism;
a transmission mechanism that changes an engagement between gears in the odd-numbered transmission gear mechanism and the even-numbered transmission gear mechanism; and
a transmission control unit that is arranged and programmed to, at a start of a drive operation of a vehicle, shift from a clutch selected from the first and second clutches on a higher transmission gear side to a clutch selected from the other of the first and second clutches on a lower transmission gear side by controlling the first and second clutches with predetermined odd-numbered and even-numbered transmission gears, respectively, in a set state, through the transmission mechanism; wherein
at the start of the drive operation of the vehicle, with the vehicle in a state in which a total torque capacity of the first and second clutches is set to a value necessary to start the drive operation of the vehicle, the transmission control unit shifts the first and second clutches by gradually increasing the torque capacity of the clutch on the lower transmission gear side curvilinearly according to a difference in clutch rotational speed on the lower transmission gear side, while at the same time gradually reducing the torque capacity of the clutch on the higher transmission gear side.

2. The dual clutch transmission apparatus according to claim 1, wherein the transmission control unit effects engagement in the clutch on the lower transmission gear side at a clutch rotational speed difference of zero or approximately zero at the start of the drive operation of the vehicle.

3. The dual clutch transmission apparatus according to claim 1, wherein the transmission control unit controls the first clutch and the second clutch by using a map in which the torque capacities of the first clutch and the second clutch are associated with each other depending on the rotational speed difference in the clutch on the lower transmission gear side so that thermal loads on the first and second clutches are equal or substantially equal.

4. The dual clutch transmission apparatus according to claim 1, wherein the lower transmission gear is the first gear and the higher transmission gear is the second gear.

5. A motorcycle comprising:
the dual clutch transmission apparatus according to claim 1.

* * * * *